United States Patent
Abadi et al.

(10) Patent No.: US 8,959,478 B2
(45) Date of Patent: *Feb. 17, 2015

(54) PLAN-BASED PROGRAM SLICING

(71) Applicant: International Business Machines Corporation, Armonk, NY (US)

(72) Inventors: Aharon Abadi, Eilat (IL); Jonathan Bnayahu, Haifa (IL); Ran Ettinger, Tel-Aviv (IL); Yishai Feldman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/889,362

(22) Filed: May 8, 2013

(65) Prior Publication Data

US 2013/0247015 A1    Sep. 19, 2013

Related U.S. Application Data

(63) Continuation of application No. 12/550,406, filed on Aug. 31, 2009, now Pat. No. 8,543,974.

(51) Int. Cl.
*G06F 9/44* (2006.01)
*G06F 11/36* (2006.01)

(52) U.S. Cl.
CPC ............. *G06F 11/3612* (2013.01); *G06F 8/75* (2013.01)
USPC ........................................................ 717/106

(58) Field of Classification Search
CPC ................ G06F 8/30; G06F 8/20; G06F 8/36
USPC ........................................................ 717/106
See application file for complete search history.

(56) References Cited

U.S. PATENT DOCUMENTS

| | | |
|---|---|---|
| 5,161,216 A | 11/1992 | Reps et al. |
| 6,179,491 B1 | 1/2001 | Choi et al. |
| 6,279,149 B1 | 8/2001 | Field et al. |
| 7,174,536 B1 | 2/2007 | Kothari et al. |
| 7,240,338 B1 | 7/2007 | Bell et al. |

FOREIGN PATENT DOCUMENTS

EP    0714064 B1    1/2002

OTHER PUBLICATIONS

Ettinger, Ran et al. "Refactoring via Program Slicing and Sliding", 2006, Oxford University Computing Laboratory Programming Tools Group, 251 pages.*
J. Ferrante, K. Ottenstein, and J. Warren. The program dependence graph and its use in optimization. ACM Transactions on Programming Languages and Systems, 9(3):319-349 Jul. 1987.

(Continued)

*Primary Examiner* — Anna Deng
(74) *Attorney, Agent, or Firm* — Patricia B. Feighan; Eyal Gilboa

(57) ABSTRACT

A method for generating a slice from a plan-based representation of a program is provided. The method comprises constructing a plan representation of a program, wherein the plan representation comprises a plurality of nodes, edges, and ports; and receiving one or more slicing criteria from a user. The slicing criteria comprise one or more variable occurrences or statements from the program, according to which a slice is generated from the plan representation.

10 Claims, 12 Drawing Sheets

(56) References Cited

OTHER PUBLICATIONS

K. Ottenstein and L. Ottenstein. The program dependence graph in software development environments. In Proceedings of the ACM SIGSOFT/SIGPLAN Software Engineering Symposium on Practical Software Development Environments, pp. 177{184, May 1984. L. Ottenstein is now known as L. Ott.

S. Horwitz and T. Reps and D. Binkley. Interprocedural slicing using dependence graphs. Proceedings of the {ACM} {SIGPLAN} '88 Conference on Programming Language Design and Implementation 1988.

Ran Ettinger, "Refactpromg via Program Slicing and Sliding", Wolfson College, Oxford University, 2006. PhD Thesis. See particularly Chapter 9 and Appendix D.

Aharon Abadi et al., "Improving Slice Accuracy by Compression of Data and Control Flow Paths", ESEC-FSC 2009.

\* cited by examiner

PLAN-BASED PROGRAM SLICING

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to computer programming and, more particularly, to program slicing.

BACKGROUND

A computer program comprises code statements designated for execution by software or a processor. Program slicing refers to extracting one or more statements (i.e., a subprogram or a slice) from a program by analyzing the program's data and control flow. Slicing may be used to generate a slice to assist program understanding, debugging, testing, verification, transformation, or other aspect of program development.

A slice comprises a set of statements that are related to or potentially related to the computation of values at certain points in the data flow or control flow in the program that a user desires to analyze (i.e., slicing criteria). Typically, a slice generator generates a slice from a program dependence graph (PDG), which represents data flow and control flow dependences of a program. Statements to include in the slice are identified by backward or forward traversal of the PDG from the slicing criteria.

Unfortunately, existing slicing approaches may generate a slice that includes unnecessary statements, fails to terminate, or is unsuitable for program transformation. Additionally, if a program is unstructured (i.e., describes an arbitrary control flow), such slicing approaches may generate a slice that is incorrect.

SUMMARY

The present disclosure is directed to systems and corresponding methods that facilitate generating a slice for a program.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for generating a slice from a plan-based representation of a program is provided. The method comprises constructing a plan representation of a program, wherein the plan representation comprises a plurality of nodes, edges, and ports; and receiving one or more slicing criteria from a user. The slicing criteria comprise one or more variable occurrences or statements from the program, according to which a slice is generated from the plan representation.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the claimed subject matter. The level of detail associated with each of the elements or features should not be construed to qualify the novelty or importance of one feature over the others.

A plan is a language-independent representation of a program that directly expresses program semantics in terms of data flow and control flow and is therefore particularly convenient for machine manipulation. Depending on implementation, a slice generator may generate a slice from a plan-based representation of a program using backward traversal, forward traversal, or any combination thereof (e.g., according to chopping, blocking, barrier slicing, thin slicing, or other slicing approaches).

Figure 1:
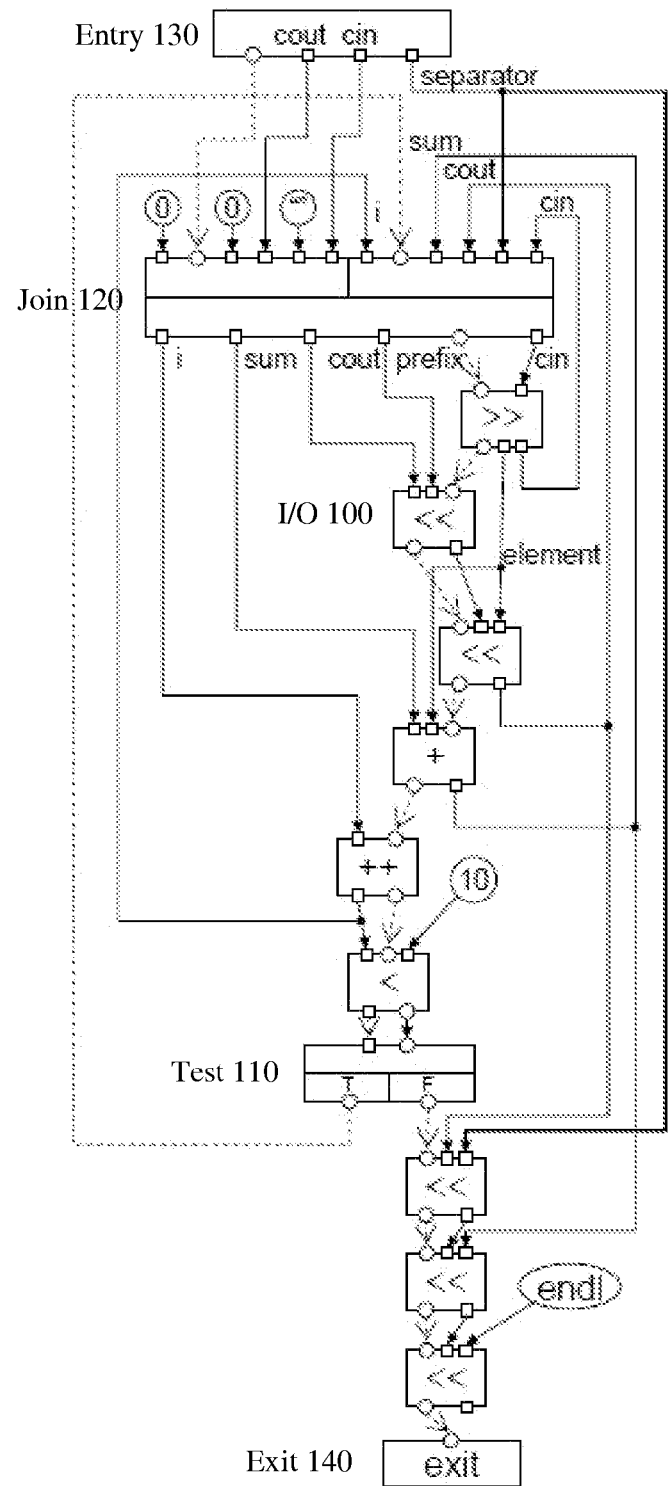
FIG. 1 illustrates an exemplary plan representing a structured program, in accordance with one embodiment.

Referring to FIG. 1, in accordance with one embodiment, an exemplary plan is provided for the following print_tuple function:

---

CODE SNIPPET 1

```
void print_tuple(const string separator) {
    string prefix = "";
    int i = 0;
    int sum = 0;
    do {
        int element;
        cin >> element;
        cout << prefix << element;
        prefix = separator;
        sum += element;
        i++;
    }
    while (i < 10);
    cout << prefix << sum << endl;
}
```

---

The above print_tuple function reads 10 integers from the input and prints the elements and their sum. The numbers printed may be separated by a given string such as a comma in order to produce a comma-separated format (e.g., a .csv file) or a tab to produce tab-delimited entries.

In one implementation, a plan comprises at least three types of nodes and two types of edges. A node annotated with an operation name (such as + or <) is an input/output (I/O) specification (e.g., I/O 100), which represents a single-entry single-exit computation. A node drawn as a rectangle divided on the bottom is a test specification (e.g., Test 110), which represents a branch in the control flow of the program. A node drawn as a rectangle divided on the top is a join specification (e.g., Join 120), which joins both control and data flow.

As illustrated in the figures, each type of node has one or more ports associated with it, either input ports (shown on top of a node, for example) or output ports (shown at the bottom of a node, for example). Data ports (e.g., represented by squares) are connected by data edges (e.g., represented by full arrows), whereas control ports (e.g., represented by circles) are connected by control edges (e.g., represented by dashed arrows). An I/O specification is associated with one input and one output control port and any number of input and output data ports, depending on the specific operation.

A test specification is associated with one input control port and two output control ports, corresponding to the two possible outcomes of a test, or condition. In a plan generated for a program written in a conventional language, a test specification is associated with a single (e.g., boolean-valued) input data port and no output data ports.

A join specification is associated with two input control ports and one output control port, which do not have any computational significance except to route data and control from whichever input side is actually executed to the output. A join specification may also be associated with any number of output data ports, as long as there are a same number of input data ports on each input side. These ports are matched by their order: the first output port receives its value from either the first input port on the right or the first input port on the left, and so on.

Although there are plans that forgo join specifications, join specifications are important for expressing data flow such that a source port, or an output control port associated with the source of a data edge dominates a target port, or an input control port associated with the target of the data edge. A node v in a single-entry, single-exit plan dominates another node u if every path from the entry to u includes v. A node u post-dominates v if every path from v to the exit includes u.

In the above implementation, data flow that comes from more than one source may be resolved, or joined, through one or more join specifications, for example. Fan-out of data corresponding to multiple uses of the same value is allowed, but fan-in is prohibited. In each case where different values might be used at the same point, the decisions of which of these values is actually used must be determined by passing the competing values through one or more join specifications.

Figure 2:
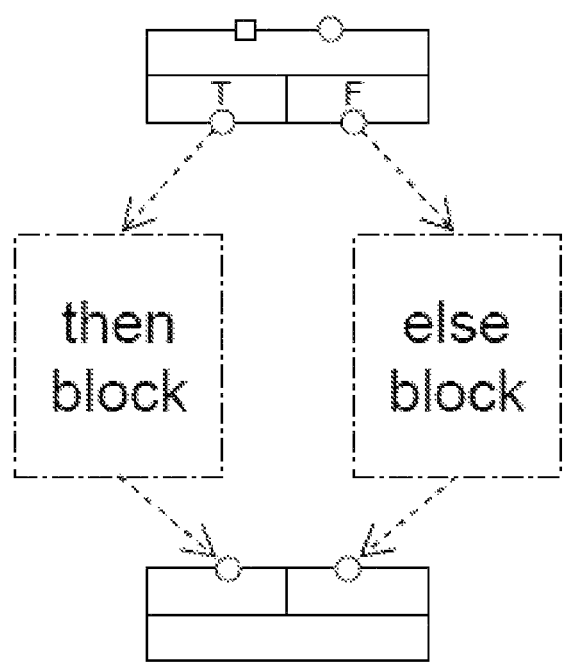
FIG. 2 illustrates an exemplary plan representing a conditional control structure, in accordance with one embodiment.
Figure 3:
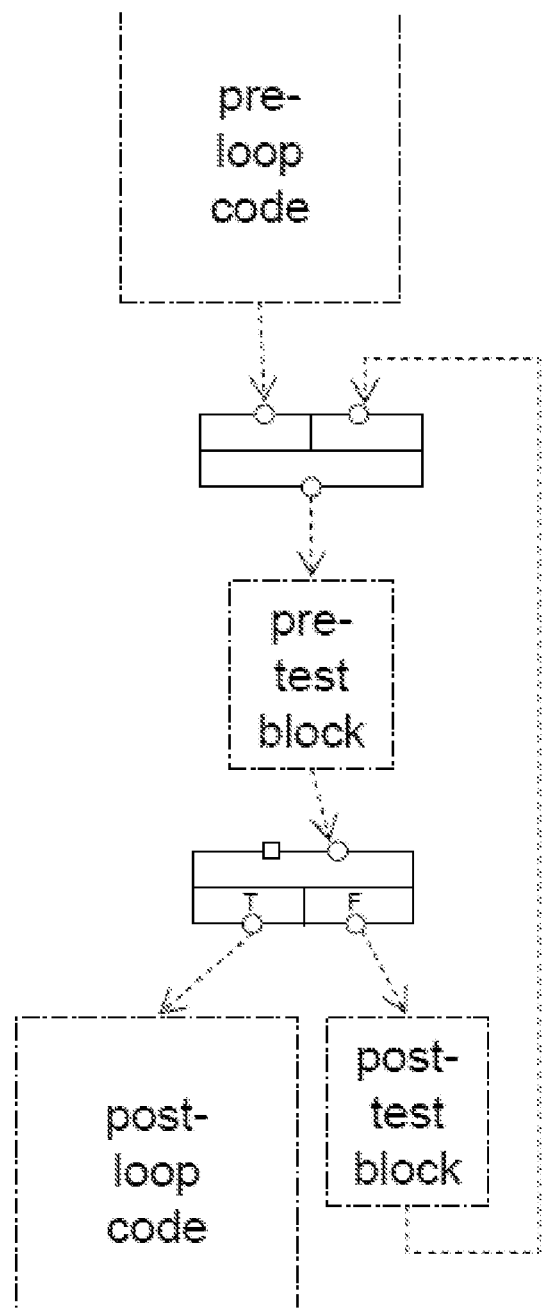
FIG. 3 illustrates an exemplary plan representing a loop control structure, in accordance with one embodiment.

An if statement, for example, may be translated into a test specification followed by a join specification, as shown in FIG. 2. A loop (e.g., while, do-while, for) usually appears inverted, as shown in FIG. 3, with the join of control preceding the loop and control returning for another iteration appearing before the loop body, and the test that controls exit from the loop somewhere below it.

In one embodiment, a plan may be connected such that each node is on some control path from an entry node (e.g., Entry 130) to an exit node (e.g., Exit 140). These nodes may be added to any surface plan. A surface plan refers to a plan that represents a fully implemented program, where each input control port has a single predecessor, except for the entry node, which is assumed to be unique.

For a function, the entry node represents the parameters, constants, or global variables used by the function. The exit node represents the return value(s) or global variables modified by the function. The entry node does not have any control or data input ports, and the exit node does not have any control or data output ports.

In one or more embodiments, a plan may represent pure specifications, implemented programs, or combinations thereof. If the plan represents a fully implemented program, the plan is deterministic. If the plan represents a specification or partially implemented program, the plan is non-deterministic. It should be understood that the systems and methods provided herein are described with respect to surface plans, which are deterministic, but may also be applied to non-deterministic plans.

In FIG. 1, Entry 130 represents the function entry point, and produces the values of the parameter separator as well as the global variables cin and cout. The latter represent objects, and operations on them produce side effects on the state of these objects as well as sometimes producing outputs. Side effects are represented in the plan by operations (e.g., >> and <<) producing the mutated objects as separate outputs. These then flow into the inputs of subsequent operations on the same objects. Thus, side effects are represented explicitly using data flow.

For convenience, constants are represented in the figures using special notation (constants inside circles). However, constants do not require an extension of the formalism and can be thought of as being generated by the entry node. As this example demonstrates, a plan abstracts away from the particular syntax of the programming language and expresses data flow and control flow directly.

In particular, control transfers and assignments are represented by the appropriate type of edges rather than by nodes. This representation makes a plan canonical to a large extent: different syntactic forms of expressing the same control structure (e.g., for, do-while, repeat-until, goto) are translated into the same plan. Similarly, data edges connect sources to their targets, regardless of how many variables and binding constructs are involved.

For example, when abstracting assembly-language programs into a plan, all intra-procedural uses of registers completely disappear. Referring to FIG. 1 and the print_tuple function, the data flow from the parameter separator to its use in the last line of the function is a direct edge (shown by a heavy arrow), even though the function uses the variable prefix to effect this data flow. The plan is constructed this way because there is a single reaching definition of prefix in the last line, and that is copied from separator. Thus, a minimal slice may be generated as shown below to compute the correct value of prefix in the last line.

---
CODE SNIPPET 2
---
```
void print_tuple(const string separator) {
    prefix = separator;
}
```
---

Each statement in a program is mapped to one or more components of a plan representing the program. Also, each component of a plan is mapped to a statement, in order to translate a generated slice back to the source code. Each I/O and test in a surface plan represents a single statement, although one statement may be represented by several I/Os or tests (as is the case for the statement cout<<prefix<<element in print_tuple).

Control edges often represent fall-through from one statement to another, and in that case are not associated with any statement. However, they may be associated with conditional or looping statements; in particular, a single control edge may represent a sequence of branches (especially in unstructured languages). Data edges represent values carried by variables or computed by expressions, and are associated with zero or more assignment statements that transfer the value between several variables.

In the slicing approaches provided below, the internal representation of a program comprises a plan and port-CDG, which is a modified form of a control dependence graph (CDG). Data dependence and control dependence of a program are defined differently for a plan than for a PDG. As provided earlier:

DEFINITION 1 (dominator, postdominator): Node v in a single-entry, single-exit graph dominates another node u if every path from the entry to u includes v. A node u postdominates v if every path from v to the exit includes u.

Figure 4:
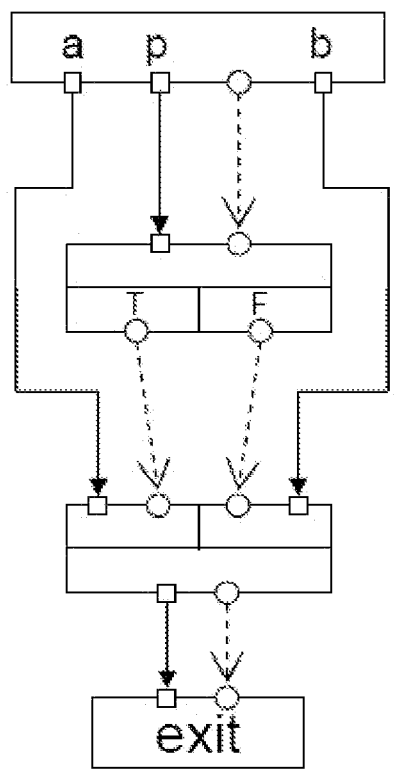
FIG. 4 illustrates an exemplary plan representing a structured program with a conditional control structure, in accordance with one embodiment.

DEFINITION 2 (control dependence): A node u in a CFG is control dependent on v if u postdominates some successor of v in the CFG but u does not postdominate v itself. Referring to FIG. 4, in accordance with one embodiment, an exemplary plan is provided for the following choose function:

---
CODE SNIPPET 3
---
```
int choose (int a, int b, bool p) {
    int x = b;
    if (p) x = a;
    return x;
}
```
---

According to the definition provided above, the join shown in FIG. 4 is not control dependent on the test, since the join is a unique successor of the test specification. The test may therefore not be part of the slice of x at the end of the function according to this definition.

But the test is relevant since the test determines which value is returned by the function. This is not a problem for approaches that keep the x=a node between the test and join in their internal representation, since that node is the successor required for the definition. This is the reason that for plan-based approaches the definition of control dependence replaces nodes with ports. Both output control ports of a test are considered to be successors of its input control port, thus making each input control port of the join control dependent on the input control port of the test.

A port-CDG is constructed by generating a CDG from the control ports of the plan, including the implicit internal connections. The output ports participate in the computation of the port-CDG, but the port-CDG is limited to relationships between input control ports, since output control ports are not part of the main computation of the slice but are added at a later stage. However, since each input control port of a plan node is connected to each output control port of the same node, the dominator and postdominator definitions given above still apply, and control dependence is appropriately adapted:

DEFINITION 2 (control dependence): An input control port p is control dependent on an input control port q of a test node t if and only if p postdominates one of the output control ports of t but does not postdominate q itself.

The definition of data dependence follows the data edges, with internal connections depending on the type of the node.

DEFINITION 3 (data dependence): An input data port p depends on an output data port q if and only if there is a data edge from q to p; any output data port of an I/O or test specification is dependent on all input data ports of the same node. Please note that this definition can easily be modified to support computations with more refined relationships. An output data port of a join depends on the corresponding input data port (in numerical order) on each incoming side.

Figure 5:
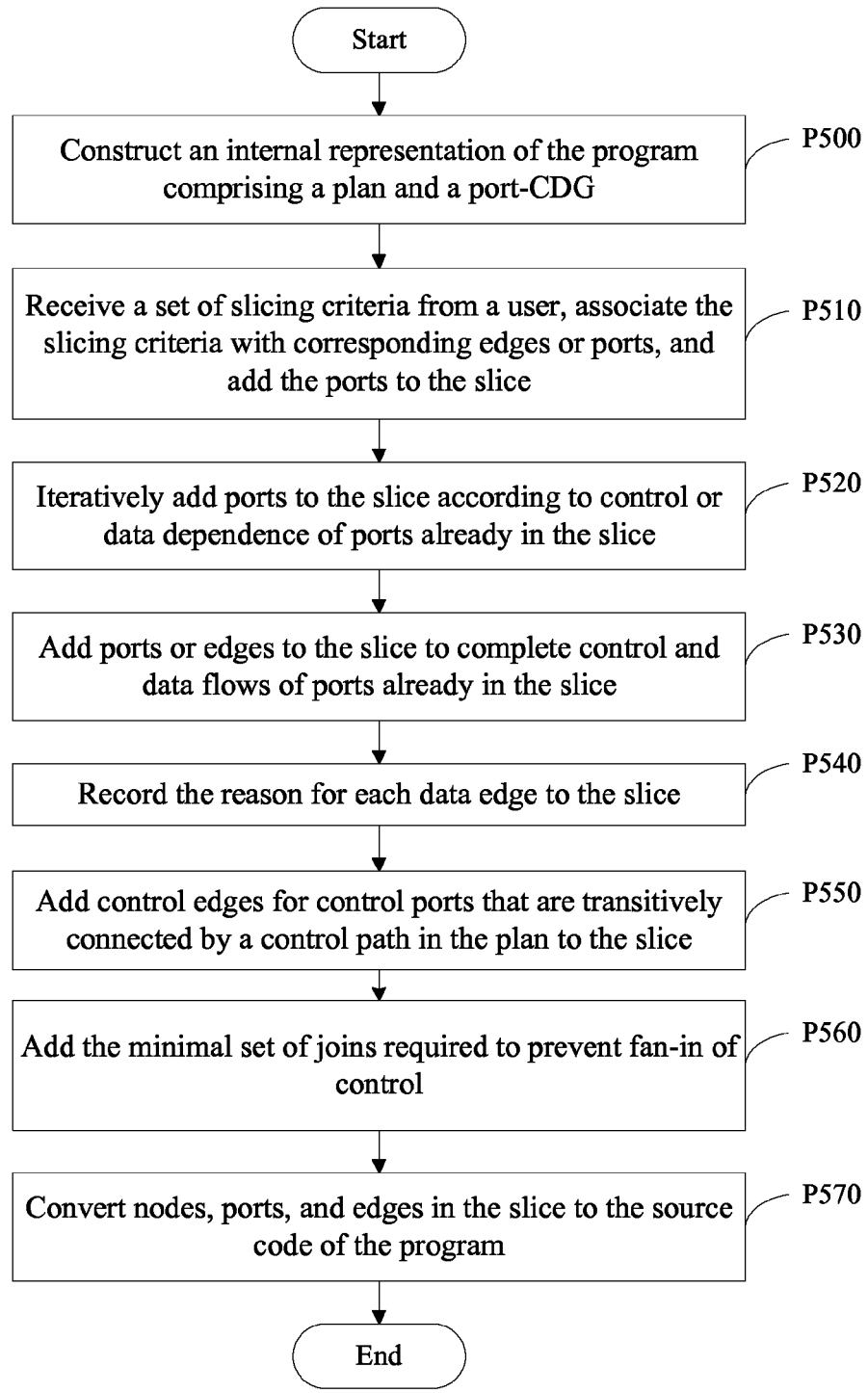
FIG. 5 is a flow diagram of an exemplary method for generating a slice from a plan-based representation of a program using backward traversal, in accordance with one embodiment.

Referring to FIG. 5, in accordance with one embodiment, a slice generator may generate a slice from a plan-based representation of a program using backward traversal. The slice generator constructs an internal representation of the program comprising a plan and a port-CDG (P500). Upon being provided with a set of slicing criteria from a user, the slice generator translates the slicing criteria to corresponding edges or ports in the plan and adds the ports to the slice (P510).

Each variable occurrence is mapped to one or more data edges, and their source ports are added to the slice. Each statement is mapped to a set of I/O or test specifications and edges. Each of the input data and control ports of the nodes are added to the slice, and each of the source ports of the edges are added to the slice. For each data output port that is associated with an I/O specification and was added to the slice, each input data and control port associated with the I/O specification is also added to the slice.

Once the initial ports are added to the slice, ports are iteratively added to the slice according to control or data dependence of ports already in the slice (P520). For each data port p in the slice, if p is data dependent on a data port p' that is not in the slice, p' is added to the slice. If p' is an output port, the input control port (or two ports in the case of a join) of the node to which p' belongs is added to the slice. For each control port p in the slice, if p is control dependent on a control port p' that is not in the slice, p' is added to the slice. Each input data port associated with the node to which p' belongs is also added to the slice.

Upon completing the iterative adding, each port associated with the exit node and each I/O specification any of whose ports is already in the slice is added to the slice. Each output control port associated with a node any of whose ports is already in the slice is added to the slice. Any control or data edges from the plan that connects two ports that are in the slice are added to the slice (P530).

In one implementation, the slice generator records the reason each data edge is added to the slice to avoid including additional statements when the slice is converted to the source program (P540). Since a series of assignments may be compressed into a single data edge, the recording allows the slice generator to convert the initial prefix of the assignment series up to the relevant slicing criterion in process P570 (in a step of decompression).

For each pair (p, p') of control ports that are transitively connected by a control path in the plan (including paths that go through joins), if the path does not go through any other ports in the slice and p and p' are not yet connected in the slice, the slice generator adds an edge connecting them, copying the source information from the original path to the new edge (P550). It is possible to choose any path between p and p' for this purpose. Paths to the exit nodes may also be added.

The slice generator also adds a set of joins from the plan to prevent fan-in of control (P560). In one implementation, the slice generator may add the minimum number of joins or tests required. In other implementations, however, the slice generator may add a larger number of joins or tests. Once the above nodes, ports, or edges are added to the slice, each of the nodes, ports, and edges are converted back to the source code of the program (P570).

For both structured and unstructured programs, the generated slice is correct because the slice was generated from a legal surface plan and computes the same values for the slicing criteria as the source program. A legal surface plan refers to a plan with the following characteristics: (1) a single entry and single exit node; (2) no fan-in of data; (3) no fan-in of control; (4) no fan-out of control; (5) the output control port associated with a source of a data edge dominates the input control port associated with its target; and (6) each node is on some control path from the entry node to the exit node.

Additionally, for structured programs, the generated slice is at least as accurate and may even be smaller (as in the "separator" example above) than slices generated using existing slicing approaches. For unstructured programs, the generated slice may be larger than slices generated using existing slicing approaches in certain scenarios. Consider the following code:

CODE SNIPPET 4

```
void unstructured(int x1, int x2, int z1, int z2,
                  bool p, bool q) {
    int x, z;
    if (p) {
        x = x2;
        if (q) goto not_p;
        else z = z1;
    }
    else {
        x = x1;
        not_p:
        z = z2;
    }
    use(z);
```

-continued

CODE SNIPPET 4

```
    use(x);
}
```

In the unstructured function, the test on q does not affect the value of x at the end of the program. Existing slicing approaches may not include the test on q in the slice, but plan-based slicing may include the test on q.

Figure 6:
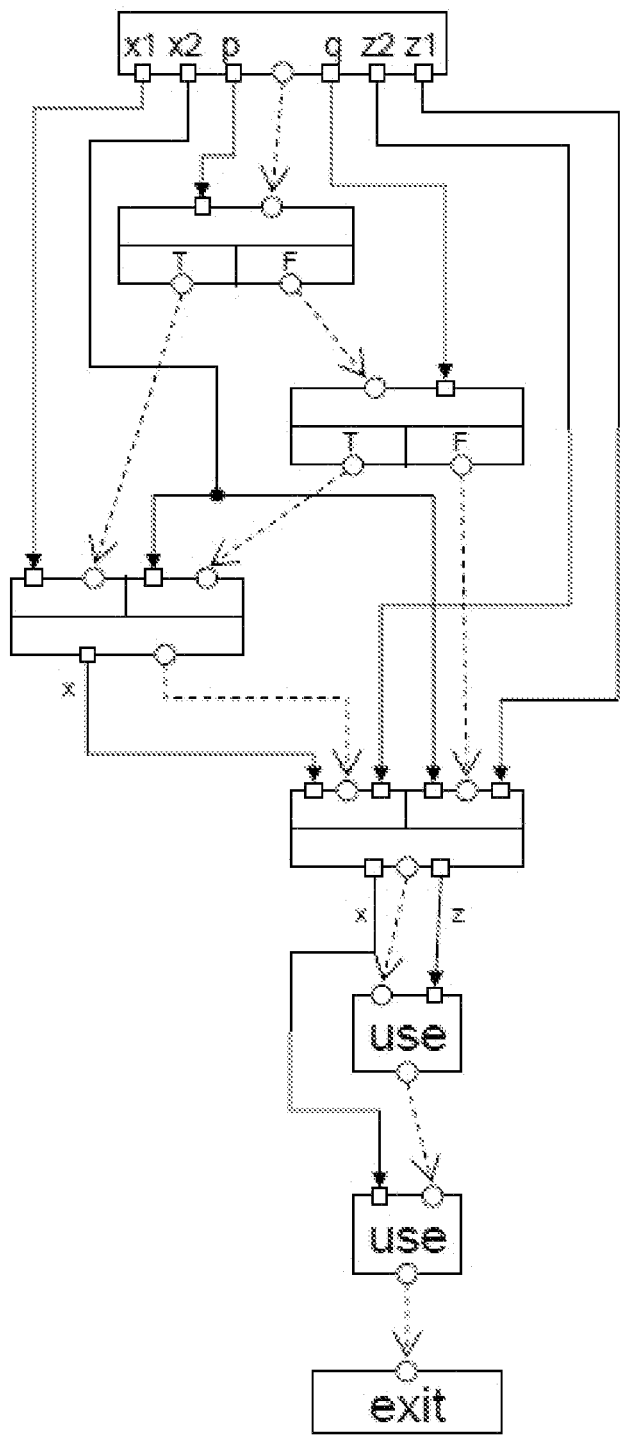
FIG. 6 illustrates an exemplary plan representing an unstructured program, in accordance with one embodiment.

The plan for the unstructured function is shown in FIG. 6. The reason that plan-based slicing includes the test on q is that the last join is control dependent on the test. Its right input control port postdominates the "F" output control port of the test, but not the "T" port. However, the reason the join was included in the slice is its x input, and in this case the same value of x is delivered to either side of the join. The plan was constructed this way because the assignment z=z2 appears on the control path between the two joins.

In one implementation, the criterion for adding a test to the slice is modified based on control dependence in order to avoid adding unnecessary tests to the resulting slice. The modified criterion takes into account the reason for attempting to add the test; that is, which data flow caused the join that is dependent on the test to be added. In the example shown in FIG. 6, x does not cause the test to be added, since the test does not affect the value of x. However, the test is added because the test affects the value of z, and the value of z causes the join to be added.

Therefore, when adding a data port of a join to the plan, the test on which the join is control-dependent may be re-evaluated according to the new criterion, even if the join is already in the slice. Furthermore, it may be that the test on which the join depends does not affect the value of the data that caused the join to be added to the slice, but some other test that controls the join at a higher level does. The slice generator may evaluate controlling tests iteratively until a test that affects the data flow is found, or until the entry node is reached.

In one implementation, a modified criterion may be defined using the two following concepts: a maximal join block and a data-carrying path.

DEFINITION 4 (maximal join block): The maximal join block of a join node n in a plan consists of all joins that are reachable from n by following control edges in both directions going only through joins.

A maximal join block has the structure of a funnel: the block starts with any number of joins and control edges are followed until reaching a single join node at the bottom. In the example shown in FIG. 6, the two joins form a single maximal join block.

DEFINITION 5 (data-carrying path): Let c be an output control port from which there is a control path that reaches the last join of some maximal join block, and let p be an output data port from which there is a data path that goes only through joins in the same block until it reaches a port p' outside the block. The control path from c to the end of the join block carries the data from p if it goes through all the joins in the block that the path from p to p' goes through, and through the same input sides.

Using the definitions provided above, the criterion for adding a test to the slice may be modified as follows: when a join is added to the slice, its maximal join block is examined, and each controlling test is a candidate for inclusion. (As mentioned above, the chain of controlling tests is examined, until the entry node.) A test is added to the slice if there is a path from one of its output control ports to the maximal join block that carries some data value, and there is a control path from the other output control port of the test that either carries a different data value to the block, or carries no value to the block.

In FIG. 6, the last join is control-dependent on the test on q. However, the paths from its two output control ports both carry the same value for x; the path from the "T" port carries this value through the two joins, while the path from the "F" port carries the same value only through the last join. Therefore, this test will not be added to the slice of x. The test is, however, added to the slice on z, because the two paths carry two different values, one originating in z1 and the other in z2.

There are a number of ways that this criterion may hold, not all of which are illustrated by FIG. 6. It is possible that there is no path from one side of the test to the maximal join block. In such a scenario, the test is added to the slice. It is also possible that the data flow carried by the control path does not exit from the last join of the block; the only requirement is that the control path shares each join in the block that the data path goes through.

Figure 7:
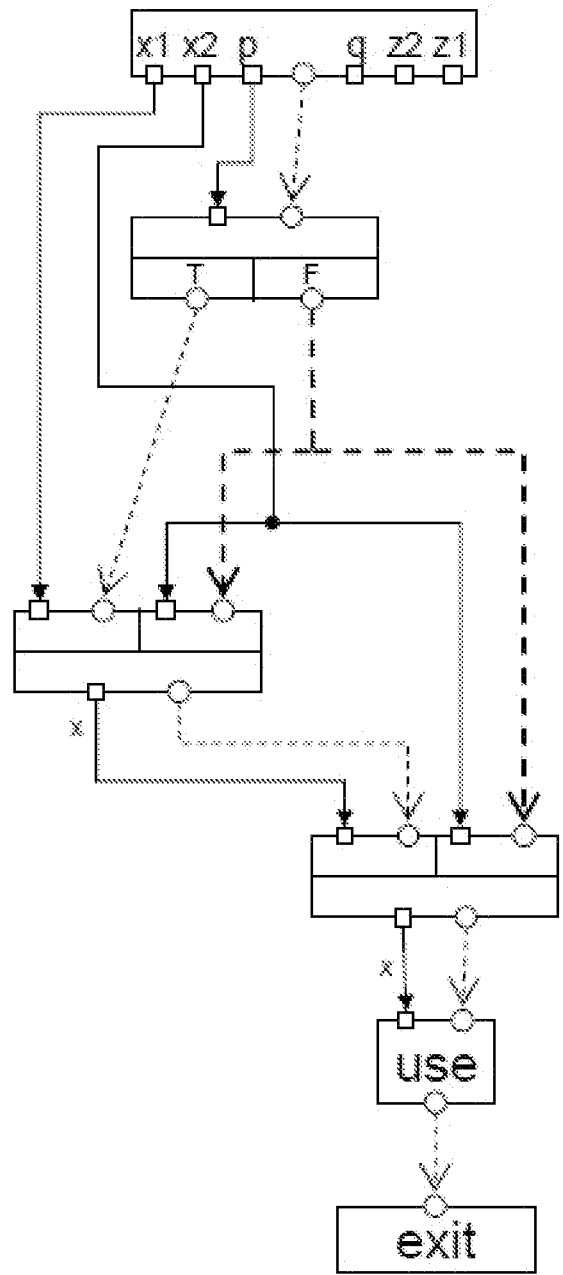
FIG. 7 illustrates an exemplary plan representing a slice of an unstructured program prior to removing fan-out of control, in accordance with one embodiment.

The slice generated using the modified criterion may be illegal according to the definition of a legal surface plan; specifically, there may be fan-out of control. For example, the slice shown in FIG. 7 shows the fan-out of control by the heavy arrow. However, in each of these cases it really does not matter which control path is chosen, since each control path produces the same values for each data port in the slice. Therefore an arbitrary path may be chosen to be included in the slice. A join that loses an incoming control edge into one of its input sides may be removed, with each data flow connected from the other side directly to the output.

Under the modified criterion for unstructured programs, the generated slice is correct and at least as accurate as slices generated using existing slicing approaches.

As provided earlier, each node and edge in the plan may be mapped to zero or more elements of the source program. After generating the slice on the plan, the mapping may be used to show the slice on the original program. However, for unstructured programs there is no natural mapping from the control paths in the slice to the branch statements in the source program. This is a consequence of the mismatch between the control flow in the plan and in the source program.

For example, consider the following program fragment:

CODE SNIPPET 5

```
if (p) {
    L1: x = 7;
    y++;
    if (q(y)) goto L2;
    goto L1;
}
x = 8;
L2: use (x);
```

Figure 8:
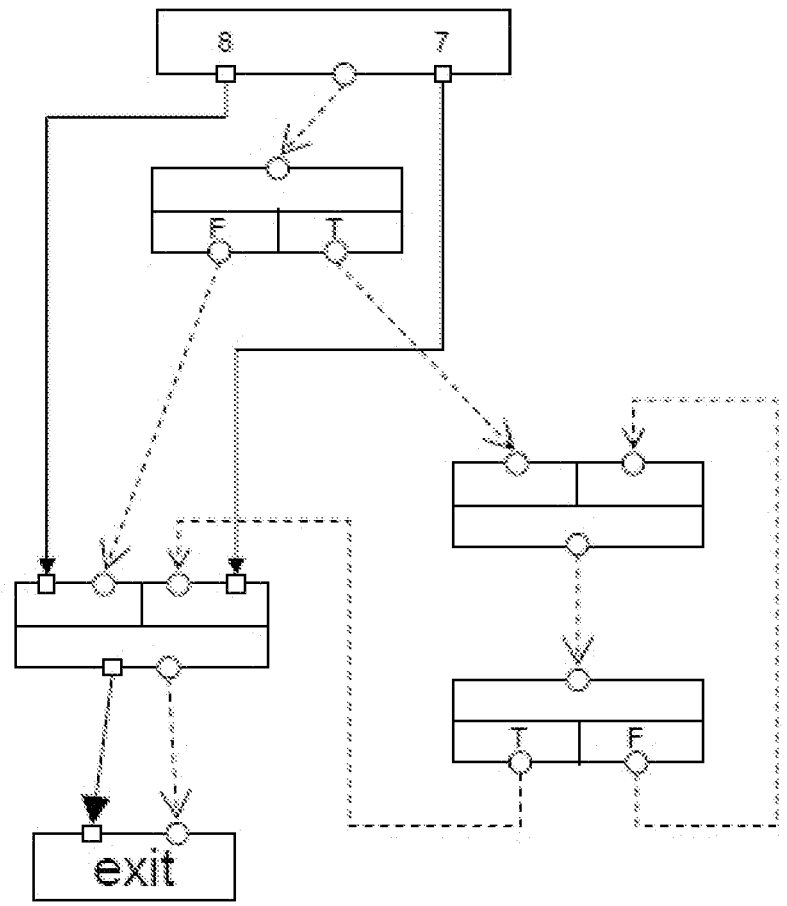
FIG. 8 illustrates an exemplary plan representing an unstructured program fragment, in accordance with one embodiment.
Figure 9:
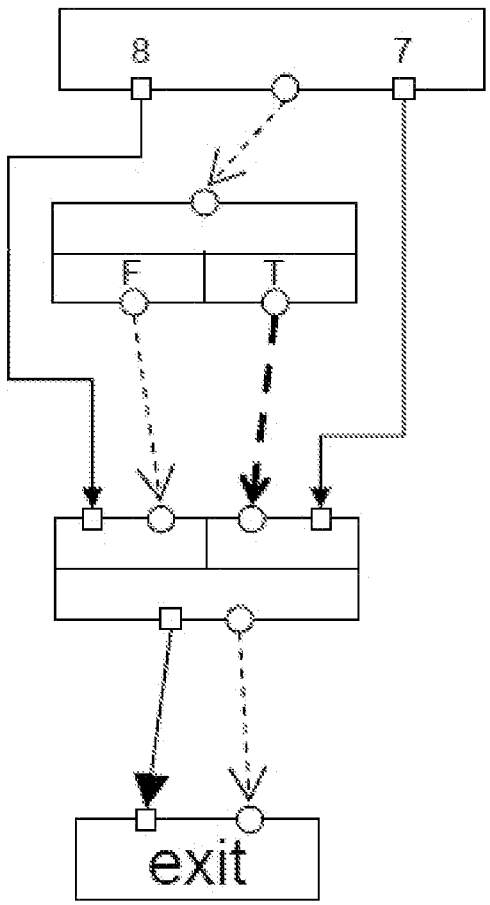
FIG. 9 illustrates an exemplary plan representing a slice of a structured program fragment, in accordance with one embodiment.

A slice on x from the last line of this program includes both assignments to x, as well as the test on p. However, y and the test that uses y are not relevant, since it does not matter how many times that loop is executed. In the plan shown in FIG. 8, the join and test on the right, which represent this loop, are not part of the slice, which is shown in FIG. 9.

Unfortunately, mapping back from the slice to the source program results in the following wrong source slice (which does not even correspond to the sliced plan):

CODE SNIPPET 6

```
if (p) {
    L1: x = 7;
}
x = 8;
L2: use (x);
```

The problem is the heavy edge in FIG. 9, which is not mapped to any statement. However, the statement goto L2 is required to separate the assignment x=7 from x=8. In order to create a correct source slice, branches may be added. Existing approaches to solving the problem, however, result in adding too many branches in certain circumstances.

In a plan, a control edge (p, q) in the slice represents one or more paths in the original program. Each control path whose source is p passes through q without passing through any other port in the slice. Therefore, any branches along any of these paths correctly complete the slice. The slicing algorithm can therefore choose which path to include according to various criteria. For example, it may choose the shortest path (in terms of branch statements it corresponds to), or it may prefer the one with the smallest number of conditional branches.

Consider the following unstructured program:

CODE SNIPPET 7

```
L1:
if (p) { x = 1; goto L2; }
if (q) { x = 2; goto L2; }
// ... code that doesn't modify p or q ...
goto L1;
L2: use(x);
```

For this program, plan-based slicing generates the following slice:

CODE SNIPPET 8

```
L1:
if (p) { x = 1; goto L2; }
if (q) { x = 2; goto L2; }
L2: use(x);
```

Existing slicing approaches add the branch to L1 in the above scenario, which is unnecessary. The slicing approach provided above, which uses the modified criterion, on the other hand, generates a correct slice without adding unnecessary branches.

In mixed programs that include explicit branches as well as other control structures, some of the branches identified may be implicit and not correspond to any branch statement in the source program. In that case, synthetic branches may be added to the slice. However, for flat programs (those that only use explicit branches) the resulting slice is a subprogram of the source program.

Figure 10:
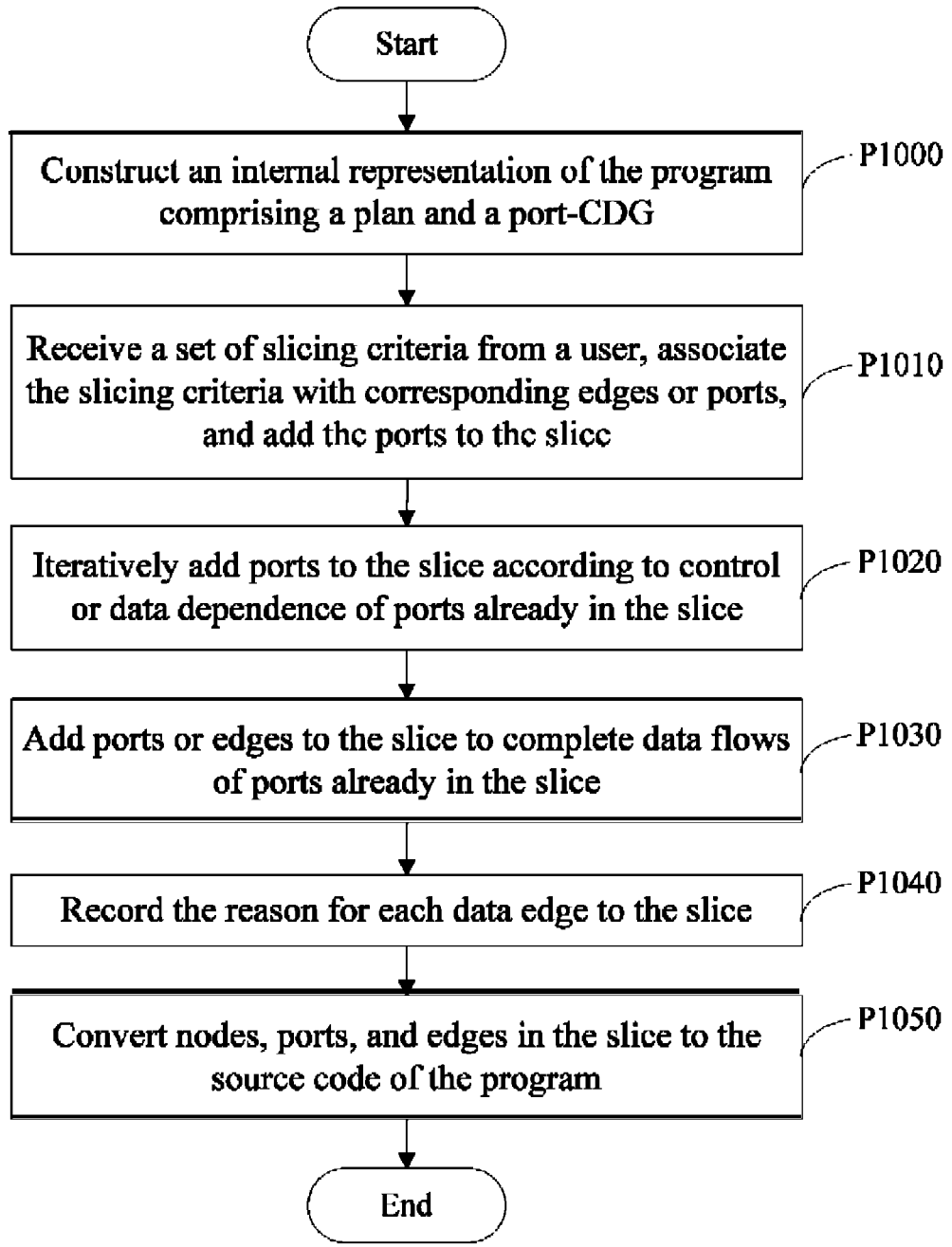
FIG. 10 is a flow diagram of an exemplary method for generating a slice from a plan-representation of a program using forward traversal, in accordance with one embodiment.

Referring to FIG. 10, in accordance with one embodiment, a slice generator may generate a slice from a plan-based representation of a program using forward traversal. The slice generator constructs an internal representation of the program comprising a plan and a port-CDG (P1000). Upon being provided with a set of slicing criteria from a user, the slice generator translates the slicing criteria to corresponding edges or ports in the plan and adds the ports to the slice (P1010).

Each variable occurrence is mapped to a data edge, and its target port is added to the slice. Each statement is mapped to a set of I/O specifications, test specifications, or edges. Each of output data and control ports of the nodes are added to the slice, and each of the target ports of the edges are added to the slice. For each data output port that is associated with an I/O specification and was added to the slice, each input data and control port associated with the I/O specification is also added to the slice.

Once the initial ports are added to the slice, ports are iteratively added to the slice (P1020). For each data port p in the slice, if there is a data port p' that is not in the slice but is data dependent on p, p' is added to the slice. If p' is an input port, the input control port (or two ports in the case of a join) and each of the output data ports of the node to which p' belongs is added to the slice. For each control port p in the slice, if there is a control port p' that is not in the slice and that is control dependent on p, p' is added to the slice. Each output data port associated with the node to which p' belongs is also added to the slice.

Upon completing the iterative adding, data edges connecting two ports that are already in the slice are added to the slice (P1030).

In one embodiment, the slice generator records the reason each data edge is added to the slice to avoid including additional statements when the slice is converted to the source program (P1040). Since a series of assignments may be compressed into a single data edge, the recording allows the slice generator to convert the initial prefix of the assignment series up to the relevant slicing criterion in process P1050.

Once the above ports and edges are added to the slice, each source statement corresponding to the ports and edges is translated back to the source code of the program (P1050).

In different embodiments, the claimed subject matter may be implemented either entirely in the form of hardware or entirely in the form of software, or a combination of both hardware and software elements. For example, a slice generator may be included in a controlled computing system environment that may be presented largely in terms of hardware components and software code executed to perform processes that achieve the results contemplated by the system of the present invention.

Figure 11:
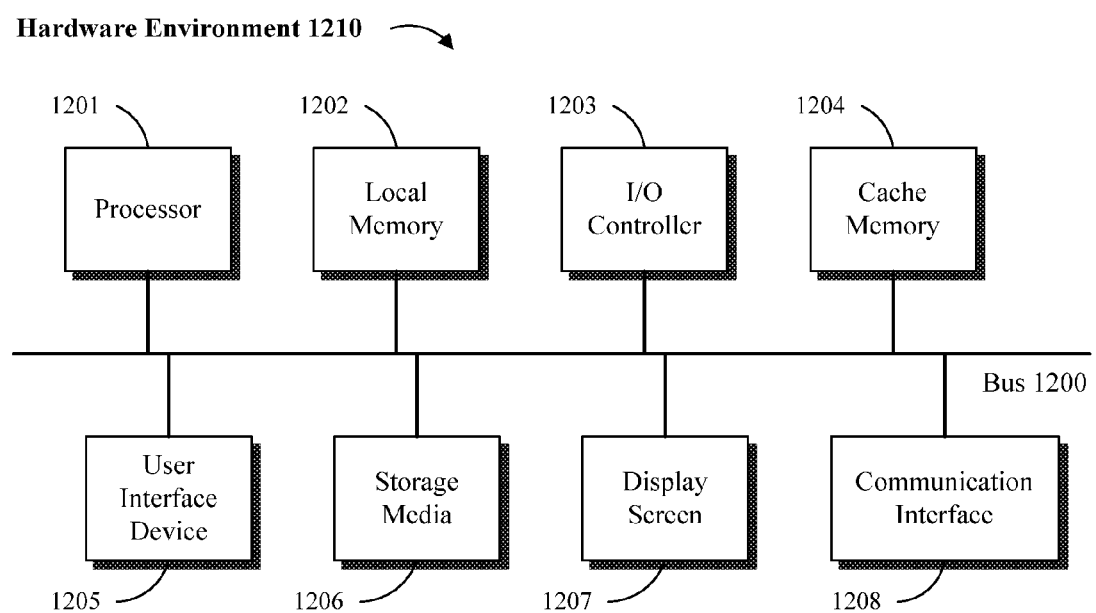
FIGS. 11 and 12 are block diagrams of hardware and software environments in which a system may operate, in accordance with one or more embodiments.
Figure 12:
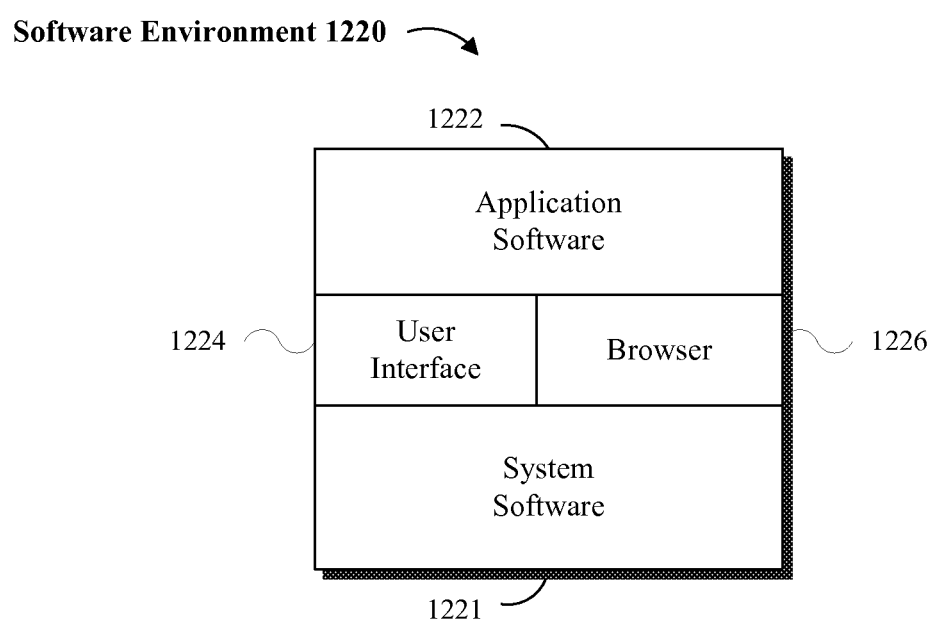

Referring to FIGS. 11 and 12, a computing system environment in accordance with an exemplary embodiment is composed of a hardware environment 1210 and a software environment 1220. The hardware environment 1210 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1220 is divided into two major classes comprising system software 1221 and application software 1222. System software 1221 comprises control programs, such as the operating system (OS) and information management systems that instruct the hardware how to function and process information.

In one embodiment, a slice generator is implemented as application software 1222 executed on one or more hardware environments to generate a slice that is executable by one or more hardware environments. Application software 1222 may comprise but is not limited to program code, data structures, firmware, resident software, microcode or any other form of information or routine that may be read, analyzed or executed by a microcontroller.

In an alternative embodiment, the slice generator may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 11, an embodiment of the application software 1222 may be implemented as computer software in the form of computer readable code executed on a data processing system such as hardware environment 1210 that comprises a processor 1201 coupled to one or more memory elements by way of a system bus 1200. The memory elements, for example, may comprise local memory 1202, storage media 1206, and cache memory 1204. Processor 1201 loads executable code from storage media 1206 to local memory 1202. Cache memory 1104 provides temporary storage to reduce the number of times code is loaded from storage media 1206 for execution.

A user interface device 1205 (e.g., keyboard, pointing device, etc.) and a display screen 1207 can be coupled to the computing system either directly or through an intervening I/O controller 1203, for example. A communication interface unit 1208, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1210 may not include all the above components, or may comprise other components for additional functionality or utility. For example, hardware environment 1210 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1208 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 12, application software 1222 may comprise one or more computer programs that are executed on top of system software 1221 after being loaded from storage media 1206 into local memory 1202. In a client-server architecture, application software 1122 may comprise client software and server software. For example, in one embodiment, client software is executed on a personal computer (not shown) and server software is executed on a server system (not shown).

Software environment 1220 may also comprise browser software 1226 for accessing data available over local or remote computing networks. Further, software environment 1220 may comprise a user interface 1224 (e.g., a Graphical User Interface (GUI)) for receiving user commands and data. Please note that the hardware and software architectures and environments described above are for purposes of example, and one or more embodiments of the claimed subject matter may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter and are further defined by the claims and their full scope of equivalents.

What is claimed is:

1. A method of generating a slice from a plan-based representation of a program, the method comprising:
constructing, by a processor, a plan representation of a program, wherein the program comprises at least one function, and wherein the plan representation comprises a plurality of entry nodes, exit nodes, edges, and ports;
wherein at least one entry node within the plurality of entry nodes represents a plurality of parameters, constants, or global variables used by the at least one function;
wherein at least one exit node within the plurality of exit nodes represents a plurality of return values or a plurality of global variables modified by the function:
receiving one or more slicing criteria from a user, wherein the one or more slicing criteria comprise one or more variable occurrences or statements from the program;
translating the one or more slicing criteria to the plurality of entry nodes, exit nodes, edges or ports in the plan representation;
mapping the one or more translated slicing criteria to the plurality of entry nodes, exit nodes, edges or ports in the plan representation; and
generating a slice from the plan representation according to the mapped slicing criteria by using backward traversal and forward traversal.

2. The method of claim 1, wherein the plan representation is constructed from a CFG (control flow graph).

3. The method of claim 1, wherein the program is a structured program.

4. The method of claim 1, wherein the program is an unstructured program.

5. A computer system of generating a slice from a plan-based representation of a program, the computer system comprising:
one or more processors, one or more computer-readable hardware memories, and program instructions stored on at least one of the one or more computer-readable hardware memories for execution by at least one of the one or more processors, wherein the computer system is capable of performing a method comprising:
constructing a plan representation of a program, wherein the plan representation comprises a plurality of entry nodes, exit nodes, edges, and ports;
wherein at least one entry node within the plurality of entry nodes represents a plurality of parameters, constants, or global variables used by the at least one function;
wherein at least one exit node within the plurality of exit nodes represents a plurality of return values or a plurality of global variables modified by the function:
receiving one or more slicing criteria from a user, wherein the one or more slicing criteria comprise one or more variable occurrences or statements from the program;
translating the one or more slicing criteria to the plurality of entry nodes, exit nodes, edges or ports in the plan representation;
mapping the one or more translated slicing criteria to the plurality of entry nodes, exit nodes, edges or ports in the plan representation; and
generating a slice from the plan representation according to the mapped slicing criteria by using backward traversal and forward traversal.

6. The computer system of claim 5, further comprising associating each variable occurrence in the slicing criteria to a corresponding data edge in the plan representation.

7. The computer system of claim 5, further comprising associating each statement in the slicing criteria to a corresponding node or edge in the plan representation.

8. The computer system of claim 5, wherein the program is structured.

9. The computer system of claim 5, wherein the program is unstructured.

10. A computer program product of generating a slice from a plan-based representation of a program, the computer program product comprising:
one or more computer-readable tangible storage medium and program instructions stored on at least one of the one or more tangible storage medium, the program instructions executable by a processor, the program instructions comprising:
program instructions to construct a plan representation of a program, wherein the plan representation comprises a plurality of entry nodes, exit nodes, edges, and ports;
wherein at least one entry node within the plurality of entry nodes represents a plurality of parameters, constants, or global variables used by the at least one function;
wherein at least one exit node within the plurality of exit nodes represents a plurality of return values or a plurality of global variables modified by the function;
program instructions to receive one or more slicing criteria from a user, wherein the one or more slicing criteria comprise one or more variable occurrences or statements from the program;
program instructions to translate the one or more slicing criteria to the plurality of entry nodes, exit nodes, edges or ports in the plan representation;
program instructions to map the one or more translated slicing criteria to the plurality of entry nodes, exit nodes, edges or ports in the plan representation; and program instructions to generate a slice from the plan representation according to the mapped slicing criteria by using backward traversal and forward traversal.

* * * * *